US007633881B2

(12) United States Patent
Mandrell et al.

(10) Patent No.: US 7,633,881 B2
(45) Date of Patent: Dec. 15, 2009

(54) BUFFERING REGISTERED STATE CHANGE NOTIFICATIONS TO REDUCE TRAFFIC DURING LARGE FABRIC CHANGES

(75) Inventors: Jon Kelly Dean Mandrell, Costa Mesa, CA (US); Robert Asaph Byam, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 472 days.

(21) Appl. No.: 11/047,985

(22) Filed: Jan. 31, 2005

(65) Prior Publication Data

US 2006/0171330 A1    Aug. 3, 2006

(51) Int. Cl.
*H04L 12/26* (2006.01)
*H04L 12/28* (2006.01)
*H04J 1/16* (2006.01)
*G06F 15/177* (2006.01)
*G06F 15/173* (2006.01)

(52) U.S. Cl. .................. 370/252; 370/254; 709/221; 709/222; 709/224

(58) Field of Classification Search ................. 370/254, 370/230; 709/221, 222, 224, 244
See application file for complete search history.

(56) References Cited

U.S. PATENT DOCUMENTS

| 7,187,659 B2 * | 3/2007 | Hammons et al. ........... 370/254 |
| 2004/0024855 A1 * | 2/2004 | Tsai et al. ................. 709/223 |
| 2004/0080527 A1 * | 4/2004 | Elliott ...................... 345/734 |
| 2005/0111378 A1 * | 5/2005 | Chen et al. ................. 370/252 |
| 2005/0271044 A1 * | 12/2005 | Hsu et al. .................. 370/360 |

OTHER PUBLICATIONS

Fibre Channel Arbitrated Loop (FC-AL) rev. 4.5, working draft proposal, American National Standard for Information Technology, Jun. 1, 1995.*
Walder, Bob, "Storage Area Network Overview", TechOnline (www.techonline.com), Jun. 5, 2002.*
McManara, Kevin, "A look at arbitrated loop", Radio Magazine (radiomagonline.com), Jul. 1, 2002.*
Lewis, Bil et al., GNU Emacs Lisp Reference Manual for Emacs Version 20.3 Revision 2.5, May 1998.*
Cisco MDS 9000 Fabric Manager Switch Configuration Guide, Cisco Systems Inc., Mar. 2004.*

(Continued)

*Primary Examiner*—Daniel J. Ryman
*Assistant Examiner*—Cassandra Decker
(74) *Attorney, Agent, or Firm*—Morrison & Foerster LLP

(57) ABSTRACT

The buffering of RSCN frames is disclosed so that RSCN traffic can be reduced. At the start of a state change notification period, a timer is started. A state change manager buffers state changes in a register that holds a pending RSCN frame by storing the address of each changed device. When a new state change is received, the address of the corresponding device is compared against each of the addresses currently stored in the buffered RSCN frame. If a duplicate address is found, the searching process ends. If no duplicate address is found, then the new address is added to the next available 32-bit field in the buffered RSCN frame. When a specified number of state changes have been received, or a specified amount of time has elapsed, the RSCN frame is sent to each initiator that had previously registered to receive state changes.

16 Claims, 5 Drawing Sheets

OTHER PUBLICATIONS

Cisco MDS 9000 Family Configuration Guide, Cisco Systems Inc., Aug. 2004.*

Fibre Channel Arbitrated Loop (FC-AL) rev. 4.5, working draft proposal, American National Standard for Information Technology, Jun. 1, 1995.*

Walder, Bob, "Storage Area Network Overview", TechOnline (www.techonline.com), Jun. 5, 2002.*

Lewis, Bil et al., GNU Emacs Lisp Reference Manual for Emacs Version 20.3 Revision 2.5, May 1998.*

* cited by examiner

BUFFERING REGISTERED STATE CHANGE NOTIFICATIONS TO REDUCE TRAFFIC DURING LARGE FABRIC CHANGES

BACKGROUND OF THE INVENTION

1. Field of the Invention

The present invention relates, generally, to the processing of change notifications when a change to a device has occurred on a loop, and in particular embodiments to the buffering of Registered State Change Notifications (RSCNs) to initiators to reduce the overhead required to process RSCNs.

2. Description of Related Art

Conventional and legacy storage systems utilize disk drives connected together in a loop, and implement a protocol such as a Fibre Channel Arbitrated Loop (FC_AL) protocol for communicating between devices connected to the loop. FIG. 1 illustrates an exemplary private loop 100 containing a number of devices 102. Note that a device, as referred to herein, includes, but is not limited to, disk drives, host bus adapters (HBAs) and other Fibre Channel (FC) devices. The private loop 100 may be referred to a Just a Bunch Of Disks (JBODs).

When a new device 104 is first connected to the private loop 100, all of the devices previously connected to the private loop 100 must be initialized using a Loop Initialization Primitive (LIP) cycle. As part of the LIP cycle, the new device 104 sends out a Loop Initialization Select Master (LISM) frame 106 to all devices in the loop 100, one by one, with the address (worldwide name) of the new device 104 initially stored into the LISM frame 106. As other devices in the loop receive the LISM frame 106, the address stored in the LISM frame 106 is checked. If a device has a greater worldwide name (lower number), it replaces the address in the LISM frame 106 with its own greater worldwide name. Eventually, the LISM frame 106 arrives back at the new device 104, containing the greatest worldwide name of any of the devices in the loop 100. The device with the greatest worldwide name (lowest number) is designated as the loop initialization master (LIM) of the initialization phase. The new LIM device sends ARB(f0) ordered sets around the loop to indicate that a master has been selected. From that point forward, the device designated as the LIM sends out future initialization frames to determine the addresses of all devices on the loop 100. Note that when one of the devices on the loop is an initiator such as an HBA (see reference character 108), the initiator is made aware of all of the devices on the loop 100 and their addresses as a result of the LIP cycle.

When a device is removed from the loop, the LIP cycle is repeated, and the process described above is performed to once again determine the addresses of all devices remaining on the loop.

As illustrated in the exemplary interconnection diagram of a storage system shown in FIG. 2, a non-blocking frame-based crossbar switch (e.g. frame-based switch 200) enable the interconnection of a large number of devices such as JBODs 202, 204, 206, and 208, and an initiator 212. The devices are connected to ports in the frame-based switch 200. Note that unlike the FC_AL private loop of FIG. 1, which utilizes an 8-bit Arbitrated Loop Protocol Address (ALPA) and has a 126 device limit, frame-based switches implement a fabric services protocol with a 24-bit address (which includes an 8-bit domain address and an 8-bit area address in addition to an 8-bit ALPA), which provides for a much higher device limit. As illustrated in FIG. 2, frame-based switches implementing the fabric services protocol support the interconnection of a private loop on each port.

In the configuration of FIG. 2, when a new device 210 is added to JBOD 202, the LIP cycle described above will be executed, and as a result all devices in JBOD 202 and the frame-based switch 200 will be provided with the address of not only the new device but all other devices in JBOD 202. However, because the initiator 212 is not connected directly to the JBOD 202 but is separated by the frame-based switch 200, the initiator 212 is not provided with the address and other information of the devices in JBOD 202.

FIG. 3 is an illustration of an exemplary frame-based switch 300 connected to an initiator 302 and various other JBODs 304. Each JBOD 304 may contain up to 126 devices, as limited by the 8-bit ALPA discussed above. The frame-based switch includes a router 310, a processor 306, a switch core 312, and ports 314. To provide the initiator 302 with information (i.e. address and other information) about the devices connected to the JBODs 304, a well-known protocol has been developed wherein the initiator 302 first sends a State Change Registration (SCR) frame 316 to a state change manager 308 (a.k.a. fabric controller) implemented in firmware by processor 306, indicating to the state change manager 308 that the initiator 302 wants to be notified when the devices in the JBODs 304 have changed. The SCR frame 316 includes a FC header 334 including the address of the initiator 302, an Extended Link Service (ELS) byte 326, an SCR byte 328 identifying the frame as an SCR frame, and an information field 330 which indicates whether the initiator 302 wants to be notified each time a device has changed, or each time a port has changed, or each time any device or port has changed. The state change manager 308 maintains a database 332 of all initiators that have registered to receive notifications of state changes (i.e. all initiators that have sent an SCR to the state change manager 308), and what types of notifications are to be sent to each initiator.

A name server 318 maintains a database 320 of information related to each of the devices attached to the frame-based switch 300, including their 24-bit address (described above), the world-wide name (WWN) of the device, and the FC-4 type (which indicates whether the device is an initiator, target, etc.). The name server 318 may also be implemented in firmware executed by the processor 306. The database 320 is needed because of the large number of devices potentially attached to the frame-based switch 300. Note that the database 320 does not include duplicate entries. When changes to a device (as identified by its 24-bit address) are made, the device sends a registration to the name server 318, and old information in the database 320 is immediately discarded and replaced by the new information. There are actually two phases to the registration. When a device is connected to a switch that provides fabric services (including the name server), it uses an FLOGI command to request a 24-bit address from the switch. When the switch receives the FLOGI ELS it registers the device in the name server database as it knows the 24-bit address and the WWN of the device. It does not know the FC-4 type yet. The next step the device will perform is logging into the name server via a PLOGI ELS and then performing a "register FC-4 types" command. This is command number 0-0217 in the name server. At this point the name server has the complete set of information about the device.

When changes are made to the name server database 320, change notifications 322 are sent to the state change manager 308. Change notifications are internal notifications inside the switch 500 comprised of data items and function calls. When a change notification 322 is received by the state change manager 308, the state change manager 308 determines from database 320 which initiators have registered to receive notifications of that particular state change, and then sends a Registered State Change Notification (RSCN) 324 to each initiator that had previously registered to receive that state change.

The RSCN 324 contains the 24-bit address of the device that changed, and an additional byte (eight bits) of information that specifies how much of the 24-bit address is valid. The possible values for that byte indicate that either: 1) the whole 24-bit address is valid, 2) the ALPA part of the address is to be ignored, or 3) the ALPA and area part of the address are to be ignored. Option 1) is used when a single device is added or deleted, and when the entire loop is plugged in. Option 2) is useful when the link between the loop and the fabric switch goes down, or when the loop is removed from the switch. An RSCN can be sent to indicate that all ALPAs with this domain and area have changed. In other words, regardless of whether a device was added or deleted, the RSCN 324 would contain the same 24-bit address for that device. Thus, after receiving an RSCN 324, an initiator must then query the name server 318 for additional details regarding the change. A protocol used within the name server 318 allows the initiator to make queries to the name server 318, such as whether a device exists at a particular address, the type of device that exists at the particular address, or other details about the device. These query commands are well-documented in the FC specifications. If the device is no longer found in the name server database 320, the initiator knows that the device has been removed from the loop. If the device is found in the name server database 320, then the initiator knows that the device was added, and can query the name server as described above to receive additional information about the added device.

FIG. 4 illustrates multiple frame-based switches 400 connected together in a single storage enclosure 402. The frame-based switches are connected together via a System Packet Interface (SPI) bus 404 daisy chained to SPI input and output ports on each frame-based switch 400. SPI is a multi-channel protocol time-division multiplexed (TDMed) over a single bus. The SPI bus 404 includes a control line, 16 data lines, and a clock. In the multi-switch environment of FIG. 4, each name server 418 maintains a database of information related to each of the devices connected to each frame-based switch 400. Each state change manager 408 in each frame-based switch 400 maintains a database of all local initiators 406 (i.e. initiators connected to that particular frame-based switch 400) that have registered to receive state changes (i.e. all local initiators that have sent an SCR to the state change manager within the frame-based switch to which the local initiator is connected).

Due the initialization procedure that is performed every time a device is added to or removed from a loop, when even a single device on a JBOD is added or removed, every device in that JBOD is initialized (even though it may receive the same address after initialization), and a large number of registrations will be sent to the name server database. As these changes are made to the name server database, a large number of change notifications are sent to the state change manager, and a large number of RSCNs are sent to the registered initiators, one for each changed device. For example, assume that a JBOD has 125 devices connected to it. When one of the devices is removed from the JBOD, a LIP cycle is performed, 125 delete registrations are sent to the name server, and 125 RSCNs are sent to the registered initiators. When the LIP cycle is completed for the remaining 124 devices, 124 add registrations are sent to the name server, and 124 RSCNs are sent to the registered initiators. When a new device is attached to the JBOD to replace the device that was removed, a LIP cycle is performed, 124 delete registrations are sent to the name server, and 124 RSCNs are sent to the registered initiators. When the LIP cycle is completed for the 125 devices, 125 add registrations are sent to the name server, and 125 RSCNs are sent to the registered initiators. Thus, the replacement of a single device into a JBOD can cause a large number of additions and deletions to be communicated to the name server, and a large number of RSCNs to be sent to the registered initiators. When an entire JBOD or all or part of the storage system that includes the frame-based switch and the JBODs is powered up, many devices have state changes, and there will be many changes to the name server database, many change notifications sent to the state change manager, and many RSCNs sent to the registered initiators, which increases traffic and reduces data throughput for the storage system. In addition, the response time (the time that a device is changed to the time that an initiator receives information about the change) is slowed down when numerous RSCNs are being processed.

Therefore, there is a need to process a large number of device changes in a storage system in an efficient manner to improve throughput and reduce traffic.

SUMMARY OF THE INVENTION

The present invention is directed to buffering RSCN frames so that RSCN traffic can be reduced and fewer name server operations need to be performed by the initiator in order to determine the exact state of each loop. In a storage system comprised of multiple JBODs and at least one initiator attached to a frame-based switch, the initiator may initially send an SCR frame to a state change manager in the frame-based switch, indicating to the state change manager that the initiator wants to receive updated information about the devices connected to the JBODs. The state change manager maintains a database of all initiators that have registered to receive these updates. A name server maintains a database of information related to each of the devices connected to the frame-based switch, including their 24-bit address, the world-wide name of the, device, and the FC-4 type. Note that the database does not keep duplicate entries. When a registration is sent to the name server indicating that a change has been made to a device, the old information is immediately discarded and replaced by the new information. When changes are made to the name server database, change notifications are sent to the state change manager.

At the start of a state change notification period (i.e. after a previous RSCN frame has been sent), a timer is started. This timer may be programmable. The timer creates a delay (e.g. two seconds) in sending out the next RSCN frame so that multiple different state changes can be buffered and duplicate state changes can be eliminated prior to sending out the next RSCN frame. When a change notification is received by the state change manager, the state change manager buffers the state changes in a register that holds a pending RSCN frame by storing the 24-bit address of each changed device. When a specified (and optionally programmable) number of state changes have been received (e.g. 256), or a specified amount of time has elapsed and the timer times out (e.g. two seconds), the RSCN frame is sent to each initiator that had previously registered to receive state changes.

The buffered RSCN frame does not contain duplicate entries for a device whose state has changed multiple times. When a new state change is received by the state change manager, the number of stored addresses is read, and the address of the device that has changed state is compared, one by one, against each of the state change addresses currently stored in the buffered RSCN frame. If a duplicate address is found, this indicates that the RSCN frame will already indicate that a change has been made to the device associated with that address, so the searching process ends. If no duplicate address is found, then the new address is added to the next available 32-bit field in the buffered RSCN frame. In addition, a count field is incremented by one. If the count field should reach a specified number (e.g. 256), this indicates that the buffered RSCN frame is full, and therefore it is sent out to all registered initiators. In addition, as described above, if the timer times out, the buffered RSCN frame is sent out even if it is not full. In either case, the timer is reset and a new state change period is started.

Because the buffered RSCN frame only contains the 24-bit addresses of the devices that changed, and an additional byte of information that specifies how much of the 24-bit address is valid, after receiving an RSCN, an initiator must then query the name server for additional details regarding the changes. The initiator can ask for the detailed information for multiple devices identified in the buffered RSCN frame in a single command.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to buffering RSCNs so that RSCN traffic can be reduced and fewer name server operations need to be performed by the initiator in order to determine the exact state of each loop.

Figure 1:
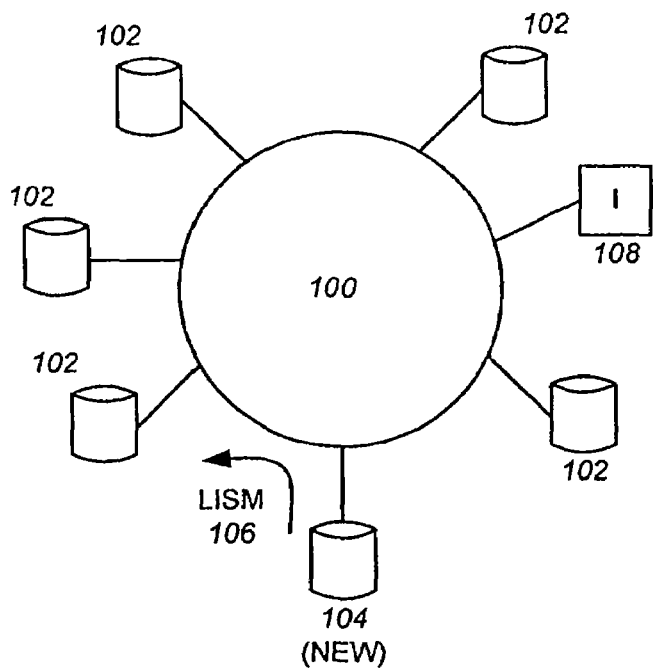
FIG. 1 illustrates an exemplary private loop containing a number of devices, and the transmission of a Loop Initialization Select Master (LISM) frame by a newly added device.
Figure 2:
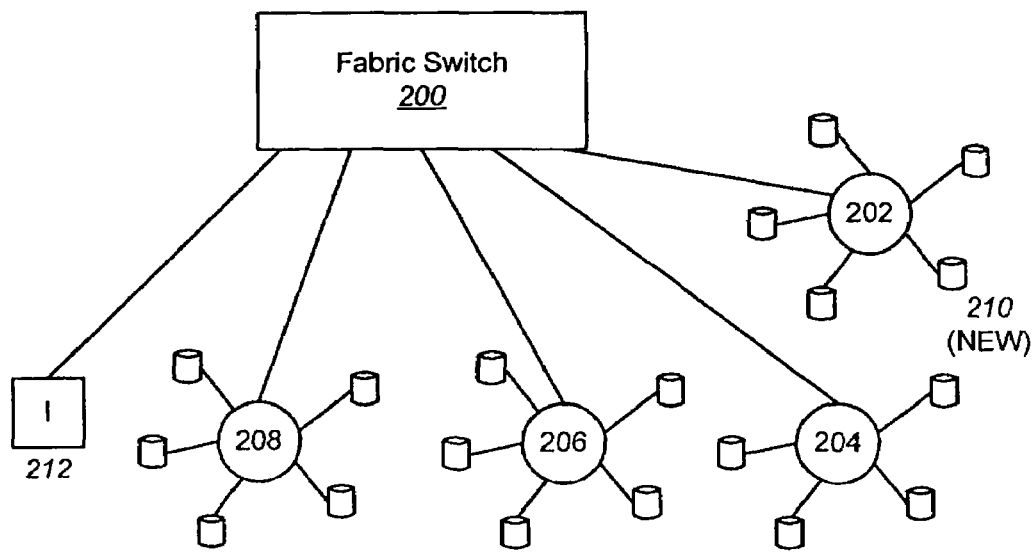
FIG. 2 illustrates an exemplary interconnection diagram of a storage system including a non-blocking frame-based crossbar switch (e.g. frame-based switch) that enables the interconnection of a large number of devices such as JBODs and an initiator.
Figure 3:
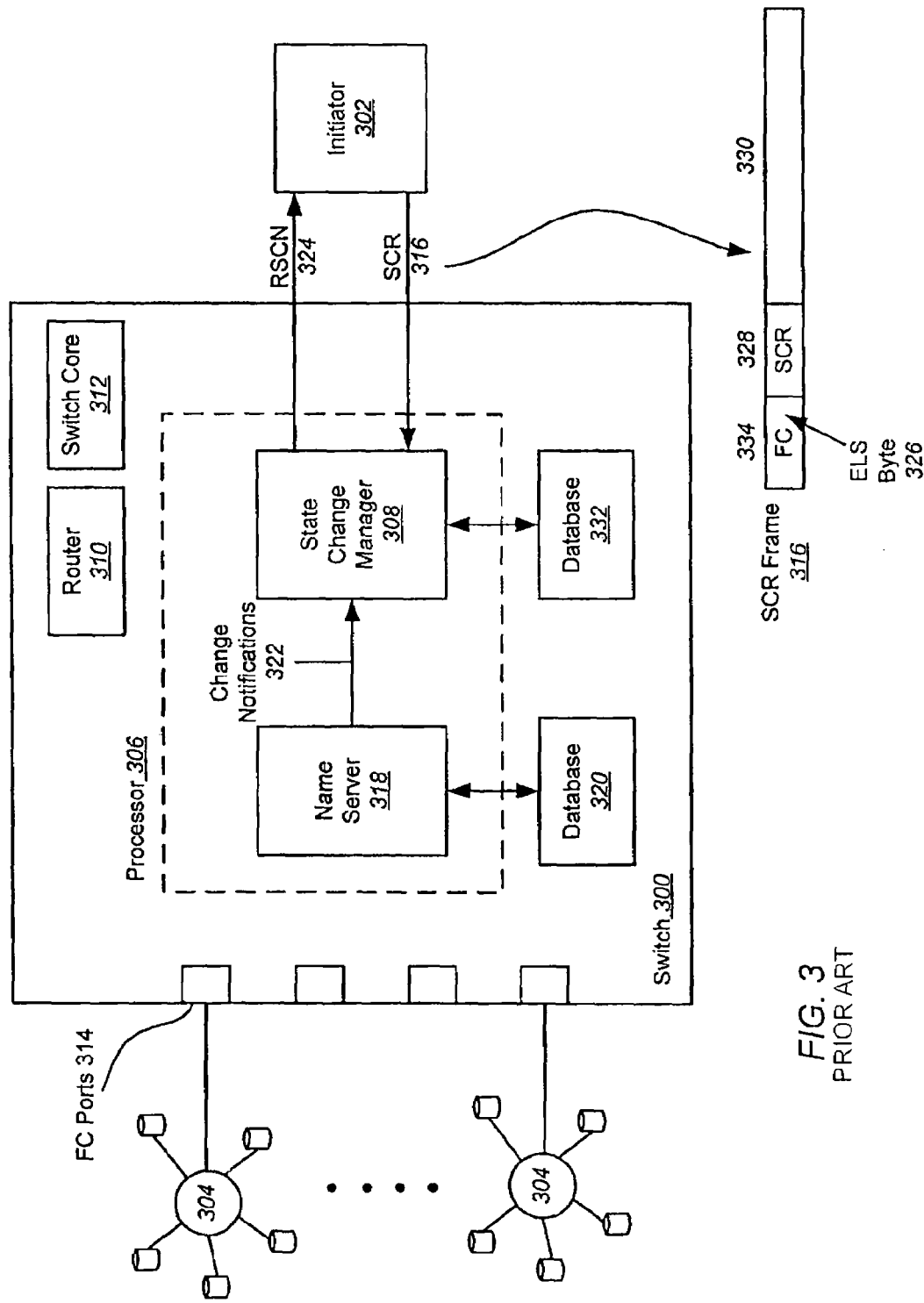
FIG. 3 illustrates an exemplary frame-based switch connected to an initiator and various other JBODs, the frame-based switch including a name server and a state change manager.
Figure 4:
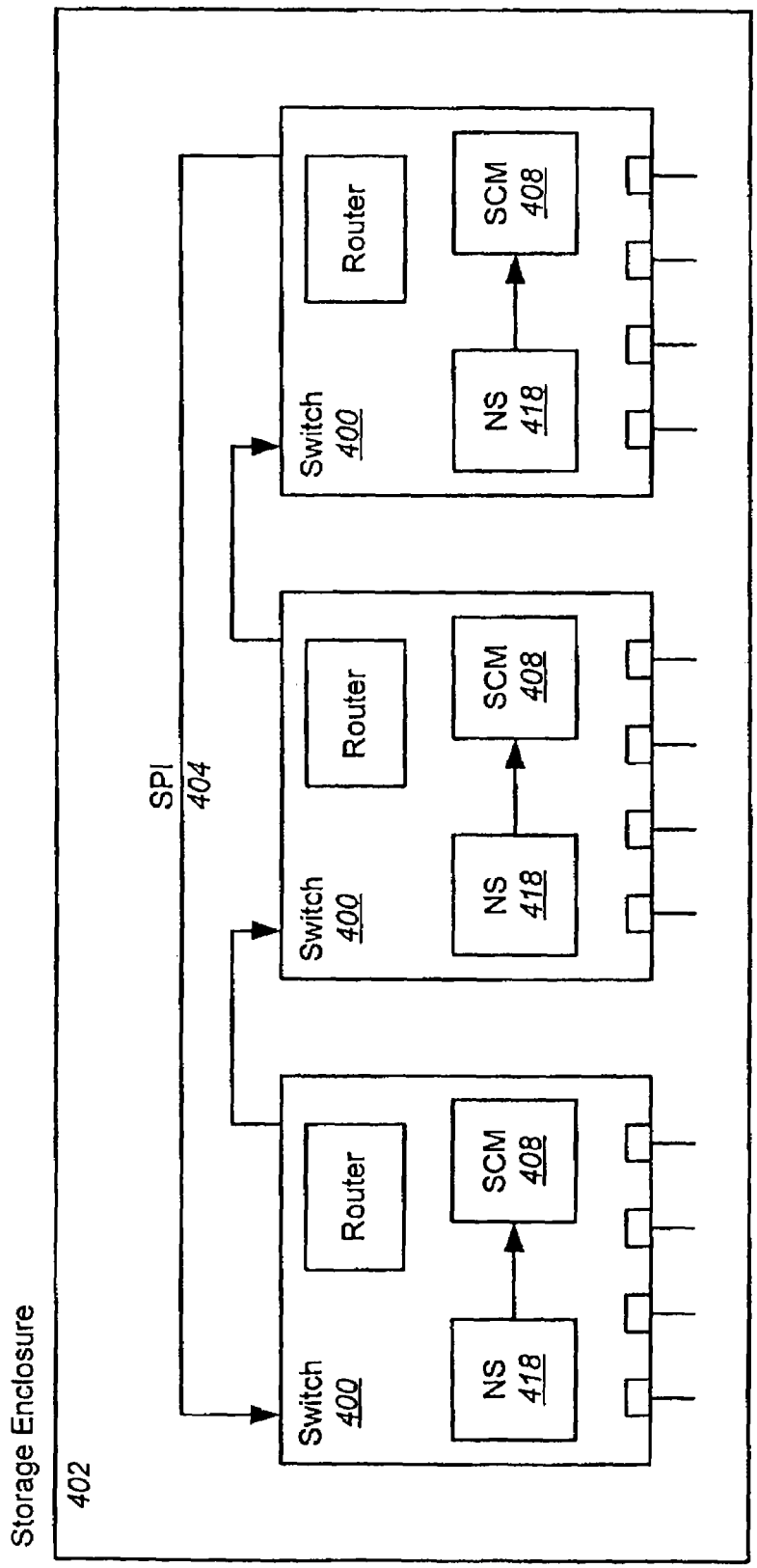
FIG. 4 illustrates multiple exemplary frame-based switches of FIG. 3 connected together in a single storage enclosure.
Figure 5:
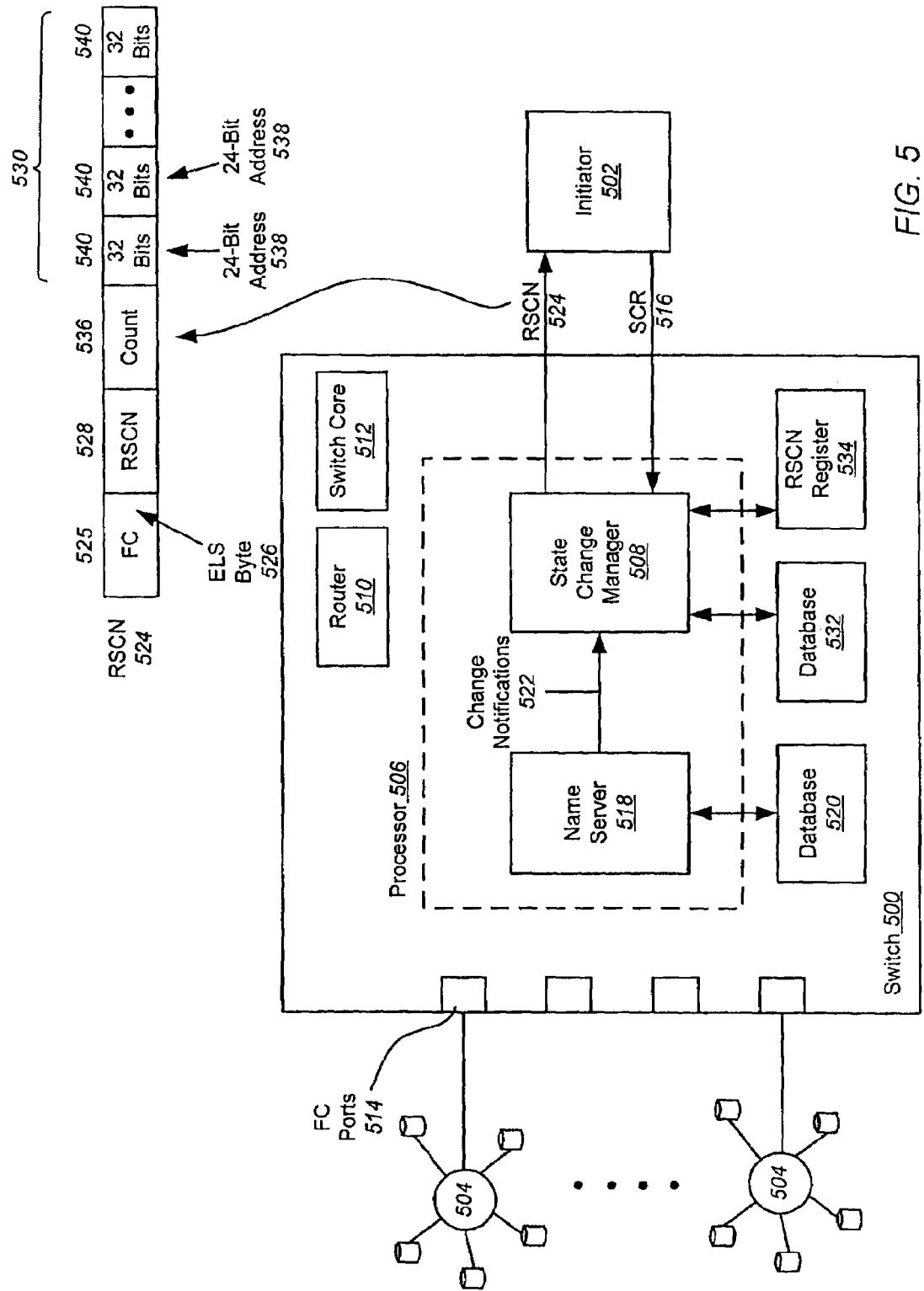
FIG. 5 illustrates an exemplary frame-based switch connected to an initiator and various other JBODs, with the frame-based switch sending buffered RSCNs to the initiator according to embodiments of the present invention.

FIG. 5 is an illustration of an exemplary storage system including a frame-based switch 500 connected to an initiator 502 and various other JBODs 504 according to embodiments of the present invention. The storage system may be a part of a larger storage area network (SAN). The frame-based switch 500 includes a router 510, a processor 506, a switch core 512, and ports 514. The initiator 502 sends an SCR frame 516 to a state change manager 508 implemented in firmware by processor 506, indicating to the state change manager 508 that the initiator 502 wants to receive updated information about the devices connected to the JBODs 504. The state change manager 508 maintains a database 532 of all initiators that have registered to receive state changes (i.e. all initiators that have sent an SCR to the state change manager 508).

A name server 518 implemented on firmware by processor 506 maintains a database 520 of information related to each of the devices connected to the frame-based switch 500, including their 24-bit address (described above), the world-wide name of the device, and the FC-4 type (e.g. the devices is an initiator, target, etc.). A protocol used within the name server 518 allows the initiator to make queries to the name server 518, such as whether a device exists at a particular address, the type of device that exists at the particular address, or other details about the device. Note that the database 520 does not keep duplicate entries. When changes to a device as identified by its 24-bit address are made, the old information is immediately discarded and replaced by the new information. When changes are made to the name server database 520, change notifications 522 are sent to the state change manager 508.

At the start of a state change notification period (i.e. after an RSCN frame has been sent), a timer is started. This timer may be programmable. The timer creates a delay (e.g. two seconds) in sending out the next RSCN frame so that multiple different state changes can be buffered and duplicate state changes can be eliminated prior to sending out the next RSCN frame. When a change notification 522 is received by the state change manager 508, the state change manager 308 buffers the state changes in a register 534 that holds a pending RSCN frame 524. When a specified (and optionally programmable) number of state changes have been received (e.g. 256), or a specified amount of time has elapsed and the timer times out (e.g. two seconds), the RSCN frame 524 is sent to each initiator that had previously registered to receive state changes.

As illustrated in FIG. 5, RSCN 524 includes a FC header 525, an ELS byte 526, an indicator 528 that the frame is an RSCN frame, and a count field 536 indicating how many state change addresses 538 are in a state change field 530. The state change field 530 is partitioned into 32-bit fields 540, each field 540 for storing a single 24-bit state change address 538. The buffered RSCN frame 524 does not contain duplicate entries for a device whose state has changed multiple times. When a new state change is received by the state change manager 508, the number of stored addresses 528 is read, and the address of the device that has changed state is compared, one by one, against each of the state change addresses 538 currently stored in the buffered RSCN frame 524. If a duplicate address is found, this indicates that the RSCN frame 524 will already indicate that a change has been made to the device associated with that address, so the searching process ends. If no duplicate address is found, then the new address is added to the next available 32-bit field 540 in the buffered RSCN frame 524. In addition, the count field 536 is incremented by one. If the count field 536 should reach a specified number (e.g. 256), then the buffered RSCN frame 524 is full, and therefore it is sent out to all registered initiators. In addition, as described above, if the timer times out, the buffered RSCN frame 524 is sent out even if it is not full. In either case, the timer is reset and a new state change period is started.

Note that if a large number of changes are occurring, a buffered RSCN frame 524 becomes full and must be sent out, and another buffered RSCN frame 524 is formed and subsequently sent out, there may be some duplication of entries between the two RSCN frames.

Because the buffered RSCN frame 524 only contains the 24-bit addresses of the devices that changed, and an additional byte (eight bits) of information that specifies how much of the 24-bit address is valid, after receiving an RSCN 324, an initiator must then ask the name server 518 for additional details regarding the changes. In embodiments of the present invention, because the initiator receives the addresses of multiple changed devices in a single buffered RSCN frame 324, the initiator can ask for the detailed information for multiple devices identified in the buffered RSCN frame 524 in a single command. The most common command is "get all next," in which the initiator provides a starting 24-bit address and the switch returns as many address as it can fit into the response in increasing values. This allows the initiator to retrieve a block of addresses in one shot. Note that in conventional systems, because the initiator received RSCNs containing only a single change, the initiator would make separate queries to the name server for each change.

To summarize the process described above, if one JBOD 504 has 125 attached devices, and one device is pulled out, a LIP cycle is started in that JBOD. 125 delete registrations are then sent to the name server 518, the name server sends change notifications 522 to the state change manager 508, and a buffered RSCN frame 524 is created listing the 24-bit addresses for each of the 125 devices. When the LIP cycle completes, 124 add registrations are sent to the name server 518, the name server sends change notifications 522 to the state change manager 508, and attempts are made to store the 124 addresses into the buffered RSCN frame 524. However, because the buffered RSCN frame 524 already contains these addresses, no new entries in the buffered RSCN frame 524 would be made. If no further changes are detected during the remainder of the state change notification period, the buffered RSCN frame 524 is sent out with the 125 addresses. Note that in this example, only one RSCN frame is transmitted to all of the initiators that registered for the changes, instead of 249, and no duplicate entries are contained in the RSCN frame. The initiators will then query the name server 518 about each of the addresses to determine what has changed. Multiple queries can be combined in a single request. For the 124 devices that are still part of JBOD 504, an entry will be found. However, for the device that has been removed, no entry will be found, and the initiator will be told that the device doesn't exist anymore.

One effect of embodiments of the present invention is that there may be a delay in notifying initiators of device changes for a specified period of time. The delay must be less than the default time that an initiator gives to a device to respond to a read request for data (e.g. two seconds). If the delay is responding is greater than the default period of time, the initiator would think the device is malfunctioning, and treat the delay as an error condition. For example, if a device is removed from a loop, a state change is buffered in an RSCN frame but not yet sent, and an initiator sends a read request to that device, the initiator will not be able to find that device. However, if a buffered RSCN frame is eventually sent to the initiator prior to the default time, the initiator will know that something has changed at the device, but it is not an error condition requiring special handling. The initiator can then query the device, determine from the name server that the device has been removed, abort the sequence that was in progress, and send an orderly failure up to the operating system, indicating that the read request failed.

Figure 6:
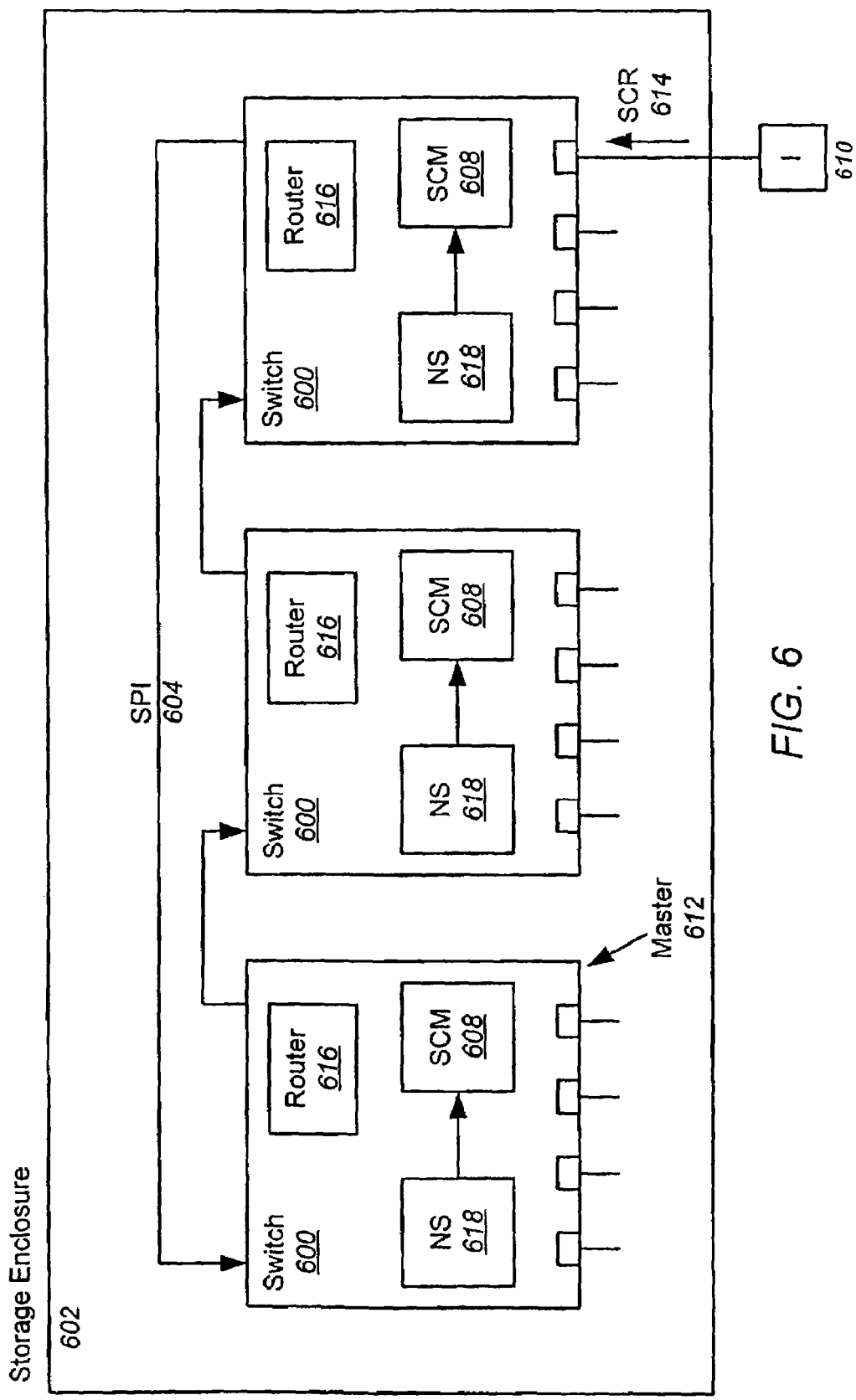
FIG. 6 illustrates multiple frame-based switches of FIG. 5 connected together in a single storage enclosure according to embodiments of the present invention.

FIG. 6 illustrates multiple frame-based switches 600 connected together in a single storage enclosure 602 according to embodiments of the present invention. The frame-based switches 600 are connected together via an SPI bus 604 daisy chained to SPI input and output ports on each frame-based switch 600. In one embodiment of the present invention, the processor 606, name server 618, and state change manager 608 in each switch 600 are operational. Each name server 618 keeps track of all devices in the enclosure by receiving change notifications from all of the devices. Each local state change manager 608 is responsible for maintaining a complete image of all switches in the enclosure, but is only responsible for sending RSCNs for the local ports. In an alternative embodiment, only one switch (e.g. frame-based switch 612 in FIG. 6) is designated as the master switch. The processor 606, name server 618, and state change manager 608 in the master switch 612 are operational and keep track of all devices and changes on all ports—the processor, name server and state change manager in all other "slave" switches are disabled. When an initiator 610 connected to a particular frame-based switch wants to register for state changes, it will send an SCR 614 to a well known address of the fabric controller (state change manager), where it is transmitted back to the state change manager in the master switch 612 by properly configuring the router 616 in each switch 600.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for reducing a number of registered state change notifications (RSCNs) sent to one or more initiators to indicate any respective changes which occurred to a plurality of devices in a storage system, said method comprising:
   receiving change notifications from changed devices, each change notification including an address of the changed device;
   buffering the addresses of the changed devices in a register for storing in a pending RSCN frame before sending the pending RSCN frame to the initiators registered to receive RSCNs, wherein an RSCN frame comprises device-specific entries consisting of address information and address validity information for the changed devices, regardless of the type of state change;
   delaying sending the pending RSCN frame to the initiators until after one or more pre-defined conditions are met; and
   in response to a single command from one of the initiators for additional information about multiple changed devices, sending the additional information to the initiator.

2. The method as recited in claim 1, further comprising:
   starting a timer prior to buffering any addresses in the register;
   sending the pending RSCN frame when the buffered addresses reach a predetermined count indicating that the register is full of buffered addresses, or after the timer has timed out; and
   resetting the timer after the pending RSCN is sent.

3. The method as recited in claim 2, wherein the timer is programmable.

4. The method as recited in claim 2, wherein the predetermined count is programmable.

5. The method as recited in claim 1, further comprising:
eliminating duplicate entries in the register by comparing the address in a received change notification to the addresses already buffered in the register;
making no changes to the register if the address in the received change notification is found in the register as a result of the comparison; and
adding the address in the received change notification to the register if the address was not found in the register as a result of the comparison.

6. The method as recited in claim 1, wherein the storage system comprises multiple daisy-chained switches connected to the initiators and the devices, the method further comprising:
for each switch, receiving change notifications from changed devices connected to any of the switches and maintaining a complete image of each of the switches, buffering the addresses of the changed devices in the register for storing in a pending RSCN frame, and sending the pending RSCN frame to the initiators connected to one or more local ports that are registered to receive RSCNs.

7. The method as recited in claim 1, wherein the storage system comprises multiple daisy-chained switches connected to the initiators and the devices, the method further comprising:
designating one switch as a master switch; and
receiving change notifications from changed devices, buffering the addresses of the changed devices in the register for storing in a pending RSCN frame, and sending the pending RSCN frame to the initiators connected to one or more local ports that are registered to receive RSCNs at the master switch.

8. One or more computer-readable storage media storing computer-executable program instructions for reducing a number of registered state change notifications (RSCNs) sent to one or more initiators to indicate any respective changes which occurred to a plurality of devices in a storage system, the program instructions executable to perform a method comprising:
receiving change notifications from changed devices, each change notification including an address of the changed device;
buffering the addresses of the changed devices in a register for storing in a pending RSCN frame before sending the pending RSCN frame to the initiators registered to receive RSCNs, wherein an RSCN frame comprises device-specific entries consisting of address information and address validity information for the changed devices, regardless of the type of state change;
delaying sending the pending RSCN frame to the initiators until after one or more pre-defined conditions are met; and
in response to a single command from one of the initiators for additional information about multiple changed devices, sending the additional information to the initiator.

9. The one or more storage media as recited in claim 8, storing further program instructions executable to perform a method comprising:
starting a timer prior to buffering any addresses in the register;
sending the pending RSCN when the buffered addresses reach a predetermined count indicating that the register is full of buffered addresses, or after the timer has timed out; and
resetting the timer after the pending RSCN is sent.

10. The one or more storage media as recited in claim 9, wherein the program instructions are capable of selectively adjusting the timer.

11. The one or more storage media as recited in claim 9, wherein the program instructions are capable of selectively adjusting the predetermined count.

12. The one or more storage media as recited in claim 8, storing further program instructions executable to perform a method comprising:
eliminating duplicate entries in the register by comparing the address in a received change notification to the addresses already buffered in the register;
making no changes to the register if the address in the received change notification is found in the register as a result of the comparison; and
adding the address in the received change notification to the register if the address was not found in the register as a result of the comparison.

13. The one or more storage media as recited in claim 8, wherein the storage system comprises multiple daisy-chained switches connected to the initiators and the devices, storing further program instructions executable to perform a method comprising:
for each switch, receiving change notifications from changed devices connected to any of the switches and maintaining a complete image of each of the switches, buffering the addresses of the changed devices in the register for storing in a pending RSCN frame, and sending the pending RSCN frame to the initiators connected to one or more local ports that are registered to receive RSCNs.

14. The one or more storage media as recited in claim 8, wherein storage system comprises multiple daisy-chained switches connected to the initiators and the devices, storing further program instructions executable to perform a method comprising:
designating one switch as a master switch; and
receiving change notifications from changed devices, buffering the addresses of the changed devices in the register for storing in a pending RSCN frame, and sending the pending RSCN frame to the initiators connected to one or more local ports that are registered to receive RSCNs at the master switch.

15. A storage system comprising the one or more storage media of claim 8.

16. A storage area network (SAN) comprising the storage system of claim 15.

* * * * *